Patented July 18, 1933

1,918,957

UNITED STATES PATENT OFFICE

ULRIC B. BRAY, OF PALOS VERDES ESTATES, CALIFORNIA, ASSIGNOR TO ATMOSPHERIC NITROGEN CORPORATION, OF NEW YORK, N. Y., A CORPORATION OF NEW YORK

CATALYST AND PROCESS FOR THE PRODUCTION THEREOF

No Drawing.     Application filed November 13, 1930. Serial No. 495,426.

This invention relates to a process for oxidizing ammonia and a catalyst therefor. More particularly, this invention relates to a process of producing a cobalt oxide catalyst and a process of oxidizing ammonia employing said catalyst.

It has been proposed heretofore to employ cobalt oxide as a catalyst for the oxidation of ammonia by means of oxygen to form oxides of nitrogen. In preparing such a catalyst, cobalt metal may be dissolved in nitric acid to form a solution of cobalt nitrate and the nitrate thus prepared converted into cobalt oxide. It has, however, been heretofore considered that cobalt oxide alone is a relatively poor catalyst for the oxidation of ammonia and, in commercial practice, resort has been had to catalysts comprising cobalt oxide together with a promoter. I have discovered, however, that pure cobalt oxide without a promoter is a highly active and efficient catalyst for ammonia oxidation.

It has been found, however, that when preparing a cobalt oxide catalyst from commercial cobalt metal, it frequently happened that the catalysts exhibited but poor catalytic activity. It is an object of this invention, accordingly, to provide a process for the production of a cobalt oxide catalyst from commercial cobalt metal which will result in the production of a contact material having a high activity in catalyzing the oxidation of ammonia by means of oxygen. It is likewise an object of this invention to provide an efficient process for the oxidation of ammonia employing a highly active cobalt oxide as a catalyst for the reaction.

I have discovered that when a solution of a cobalt salt prepared from impure cobalt metal is treated with an alkaline precipitant in amount not greater than that required to precipitate a portion only of the cobalt, the solution is separated from the precipitate and a contact material is prepared from the unprecipitated cobalt, an active catalyst material results. I have further discovered that even in the case of catalysts prepared from a relatively pure cobalt, an intermediate solution of the cobalt and partial precipitation serves to enhance the activity of the catalyst. I have discovered that catalysts prepared in accordance with this invention not only exhibit a relatively high degree of activity but that they remain active during long periods of use without undergoing a rapid deterioration and loss of activity such as is commonly encountered in the art of catalytic ammonia oxidation.

In manufacturing a catalyst material in accordance with this invention, a solution of a cobalt salt is prepared and an alkaline precipitant is added to the solution in amount not greater than that required to precipitate a portion only of the cobalt. The alkaline precipitant is preferably added in amount sufficient to precipitate a portion only of the cobalt. The precipitate which is formed is separated from the solution and the unprecipitated cobalt in the solution is employed for the preparation of a catalyst. The catalyst thus prepared is employed for the oxidation of ammonia by means of oxygen.

The invention accordingly comprises the several steps and the relation of one or more of such steps with respect to each of the others and the catalyst possessing the features and properties and the relation of constituents, which are exemplified in the following detailed disclosure and the scope of the invention will be indicated in the claims.

For a fuller understanding of the nature and objects of the invention, reference should be had to the following detailed description of a process for the preparation of a catalyst and its use for the oxidation of ammonia in accordance with this invention.

Commercial cobalt is dissolved in nitric acid to form a solution of cobalt nitrate. The solution of cobalt nitrate may be prepared in accordance with the process described in copending U. S. application Serial No. 361,414 filed May 8, 1929, by Eugene D. Crittenden. Ammonia is added to the solution of cobalt nitrate in amount sufficient to precipitate a portion only of the cobalt and preferably sufficient to precipitate about 5% of the cobalt contained in the solution. This requires the addition of sufficient ammonia to neutralize any free acid contained in the solution, to react with any impurities which may be contained therein with which ammonia reacts and, in addition, the amount required for the precipitation of the desired proportion of the cobalt. The addition of ammonia may be accomplished by absorbing gaseous ammonia in the cobalt nitrate solution and preferably by passing a mixture of air and gaseous ammonia through the solution. By operating in this manner, the solution is agitated while the precipitate is being formed. The precipitate thus formed is separated from the solution in any desired manner, as for example by filtering.

It has been found that by adding ammonia sufficient to precipitate a part of the cobalt that impurities contained in the solution of cobalt nitrate prepared from commercial cobalt metal are likewise precipitated and/or are carried down with the cobalt precipitate. It has been noted that in general commercial cobalt contains an appreciable amount of various impurities including iron and phosphate impurities which, when the metal is dissolved in nitric acid, goes into solution. Upon the addition of ammonia to the solution of cobalt nitrate containing a relatively small amount of dissolved compounds of iron, such as iron nitrate and other impurities, the iron is precipitated as iron hydroxide together with phosphorous and such other impurities of the type of phosphates as may be present, which impurities are rendered less soluble than cobalt hydroxide by the ammonia. It is believed that phosphorous impurities from the cobalt metal which are present in the cobalt nitrate solution as phosphate react with the iron to form a phosphate of iron which, being highly insoluble in the solution to which the ammonia has been added, is precipitated and is removed together with the cobalt and iron precipitate. It may be desirable, therefore, when a cobalt metal free from iron is to be treated in accordance with this invention to add a small amount of iron nitrate to the cobalt nitrate solution prior to the addition of the ammonia. The ammonia acts not only as a cobalt precipitant but also as an iron precipitant. The above explanation of the invention is offered as a means of better understanding the nature of the new process which I have discovered, but my invention is in no way to be limited by this theory of the effects attendant upon the treatment with ammonia.

The solution of cobalt nitrate thus produced is heated to drive off the water content and is then further heated preferably at progressively increasing temperatures to decompose the cobalt nitrate and form cobalt oxide. A final temperature of heating of about 400° C. has been found satisfactory. The cake of cobalt oxide thus formed is broken up into particles of a desired size and the granular material thus obtained placed in a suitable vessel. The cobalt oxide material is heated and a mixture of air and ammonia, containing preferably about 9% ammonia, is passed in contact therewith. The ammonia is oxidized to form oxides of nitrogen which may be recovered as such or may be converted into nitric acid as may be desired.

Since certain changes may be made in carrying out the above process without departing from the scope of the invention, it is intended that all matter contained in the above description shall be interpreted as illustrative and not in a limiting sense. For example, it is not intended that the appended claims be limited to the specific manner of preparing the cobalt oxide catalyst from the solution of cobalt nitrate described, nor that they be limited to any particluar manner of carrying out the oxidation of ammonia. The starting material need not be cobalt metal. Cobalt nitrate may be purchased on the market and a solution of the same treated as described above with an alkaline precipitant prior to the production of cobalt oxide from the nitrate.

In place of ammonia which is the alkaline precipitant employed in the process specifically described above, ammonium carbonate may be employed for the treatment of the cobalt solution in accordance with this invention. Furthermore, under proper conditions other alkaline reagents may be employed in place of ammonia, for example, sodium or potassium hydroxide or carbonate. I have found that while the presence of sodium in a cobalt oxide catalyst acts as a temporary inhibitor, a catalyst containing upwardly of 2 parts of sodium calculated as sodium oxide ($Na_2O$) for every 100 parts of cobalt oxide increases in activity when employed at an elevated temperature for the oxidation of ammonia and in a short time is substantially as active as a catalyst free from sodium. The influence of potassium upon a cobalt oxide catalyst is comparable to that of sodium. Accordingly, if it be desired, sodium or potassium hydroxide or carbonate may be employed for the treatment of the cobalt nitrate solution so long as an undesirably large amount of the sodium or potassium is not thereby introduced into the catalyst. For example, in the case of sodium hydroxide or carbonate, they should not be employed in amounts such as will introduce into the catalyst more than about 2 parts of sodium (as $Na_2O$) for every 100 parts of cobalt oxide. It is preferred, however, to employ a precipitant such as ammonia or ammonium carbonate, the residues from which (ammonium nitrate or chloride) are volatilized by the subsequent ignition treatment for the production of the catalyst. This is particularly true when the solution contains any considerable amount of acid which requires the use of sufficient precipitant to react therewith in addition to the amount required for the precipitation of the desired proportion of cobalt Whatever the particular precipitant may be it is apparent that it should not contain impurities which deleteriously affect the catalyst prepared from the solution after treatment to precipitate a portion of the cobalt. When, therefore, in the specification and claims the term "alkaline precipitant" is employed, it is intended to refer to an alkaline precipitant for cobalt such as ammonia or sodium hydroxide, the use of which for the treatment of the cobalt nitrate solution does not result in a poisoning of the catalyst.

I claim:

1. The process of producing a cobalt catalyst which comprises preparing a solution of a cobalt salt, adding an alkaline precipitant to said solution in amount sufficient to precipitate a portion only of the cobalt, separating the precipitate from the solution, and preparing a cobalt catalyst from the thus separated solution.

2. The process of producing a cobalt catalyst which comprises preparing a solution of a cobalt salt containing impurities of the type of phosphates, adding an alkaline precipitant to said solution in amount sufficient to precipitate a portion only of the cobalt, separating the precipitate from the solution, and preparing a cobalt catalyst from the thus separated solution.

3. The process of producing a cobalt catalyst which comprises preparing a solution of a cobalt salt, adding ammonia to said solution of cobalt salt in amount sufficient to precipitate a portion only of the cobalt, separating the precipitate from the solution, and preparing a cobalt catalyst from the thus separated solution.

4. The process of producing a cobalt catalyst which comprises preparing a solution of cobalt nitrate, adding ammonia to said solution in amount sufficient to precipitate a portion only of the cobalt, separating the precipitate from the solution, recovering cobalt nitrate from said separated solution, and heating the cobalt nitrate to decompose it and produce cobalt oxide.

5. The process of producing a cobalt catalyst which comprises preparing a solution of cobalt nitrate, treating said solution with mixture of air and ammonia in amount sufficient to precipitate a portion only of the cobalt, separating the precipitate from the solution, recovering cobalt nitrate from said separated solution, and heating the cobalt nitrate to decompose it and produce cobalt oxide.

6. The process of producing a cobalt catalyst which comprises preparing a solution of cobalt nitrate, adding ammonia to said solution in amount sufficient to precipitate about 5% of the cobalt, separating the precipitate from the solution, recovering cobalt nitrate from said separated solution, and preparing a cobalt catalyst from the cobalt nitrate.

7. The process of producing a cobalt oxide catalyst which comprises preparing a solution of a cobalt salt containing impurities of the type of phosphates, adding ammonia to said solution in amount sufficient to precipitate a portion only of the cobalt, separating the precipitate from the solution, and preparing a cobalt oxide catalyst from the thus separated solution.

8. The process of producing a cobalt oxide catalyst which comprises preparing a solution of a cobalt salt, adding an alkaline precipitant to said solution in amount sufficient to precipitate a portion only of the cobalt, separating the precipitate from the solution, and preparing a catalyst consisting of cobalt oxide from the thus separated solution.

9. The process of producing a cobalt oxide catalyst which comprises preparing a solution of a cobalt salt containing impurities of the type of phosphate, adding ammonia to said solution in amount sufficient to precipitate a portion only of the cobalt, separating the precipitate from the solution, and preparing a catalyst consisting of cobalt oxide from the thus separated solution.

10. The process of producing an ammonia oxidation catalyst which comprises adding an alkaline precipitant to a solution of cobalt nitrate containing impurities of the type of phosphate in amount sufficient to precipitate a portion only of the cobalt, separating the precipitate from the solution, and converting the cobalt in the separated solution into cobalt oxide.

11. The process of producing an ammonia oxidation catalyst which comprises treating a solution of cobalt nitrate containing impurities of the type of phosphate with a mixture of air and ammonia in amount sufficient to precipitate a portion only of the cobalt, separating the precipitate from the solution, and converting the cobalt in the separated solution into cobalt oxide.

12. The process of producing an ammonia oxidation catalyst which comprises dissolving cobalt in nitric acid, adding ammonia to the solution of cobalt nitrate thus prepared in amount sufficient to precipitate about 5% of the cobalt, separating the precipitate from the solution, recovering cobalt nitrate from said separated solution, and heating the cobalt nitrate to decompose it and produce cobalt oxide.

13. The process of producing a cobalt oxide catalyst which comprises preparing a solution of a cobalt salt containing a dissolved compound of iron, adding an alkaline precipitant to said solution of cobalt salt in amount sufficient to precipitate a portion only of the cobalt, separating the precipitate from the solution, and preparing a cobalt oxide catalyst from the thus separated solution.

14. The process of producing a cobalt oxide catalyst which comprises preparing a solution of cobalt nitrate containing iron nitrate, adding ammonia to said solution in amount sufficient to precipitate a portion only of the cobalt, separating the precipitate from the solution, recovering cobalt nitrate from said separated solution, and heating the cobalt nitrate to decompose it and produce cobalt oxide.

15. The process of producing a cobalt oxide catalyst which comprises preparing a solution of cobalt nitrate containing iron nitrate and impurities of the type of phosphate, adding ammonia to said solution in amount sufficient to precipitate about 5% of the cobalt, separating the precipitate from the solution, recovering cobalt nitrate from the separated solution, and decomposing said cobalt nitrate to form cobalt oxide.

16. The process of producing a cobalt oxide catalyst which comprises preparing a solution of cobalt nitrate containing iron nitrate and impurities of the type of phosphate, passing a mixture of air and ammonia through said solution in amount sufficient to precipitate about 5% of the cobalt, separating the precipitate from the solution, recovering cobalt nitrate from the separated solution, and decomposing said cobalt nitrate to form cobalt oxide.

17. A catalyst for ammonia oxidation comprising cobalt oxide prepared from a solution of a cobalt material resulting from the process of claim 1.

18. The process of oxidizing ammonia which comprises contacting ammonia and oxygen with a cobalt oxide catalyst prepared by the process claimed in claim 1.

19. A catalyst for promoting chemical reactions comprising a cobalt material prepared from a solution of a cobalt material resulting from the process of claim 1.

20. The process of catalyzing chemical reactions which comprises passing material which is to undergo reaction in contact with a cobalt catalyst prepared in accordance with the process of claim 1.

21. The process of producing a cobalt catalyst which comprises preparing a solution of a cobalt salt, adding an alkaline precipitant to said solution in amount not greater than that required to precipitate a portion only of the cobalt, separating the precipitate from the solution, and preparing a cobalt catalyst from the thus separated solution.

22. The process of producing an ammonia oxidation catalyst which comprises adding ammonia to a solution of cobalt nitrate containing impurities in amount sufficient to produce a precipitate from said solution and not greater than that required to precipitate a portion only of the cobalt, separating the precipitate from the solution, and converting the cobalt nitrate in the separated solution into cobalt oxide.

23. The process of oxidizing ammonia which comprises contacting a gas which contains ammonia and oxygen with a cobalt oxide catalyst prepared by the process claimed in claim 22.

24. A catalyst for the oxidation of ammonia consisting of cobalt oxide prepared by adding ammonia to a solution of cobalt nitrate free from impurities not precipitated by ammonia to precipitate only a portion of the cobalt, separating the solution from the precipitate, and converting cobalt nitrate contained in said solution into cobalt oxide.

ULRIC B. BRAY.